(No Model.)
P. WIEDERER.
FOLDING MIRROR.
No. 387,387. Patented Aug. 7, 1888.
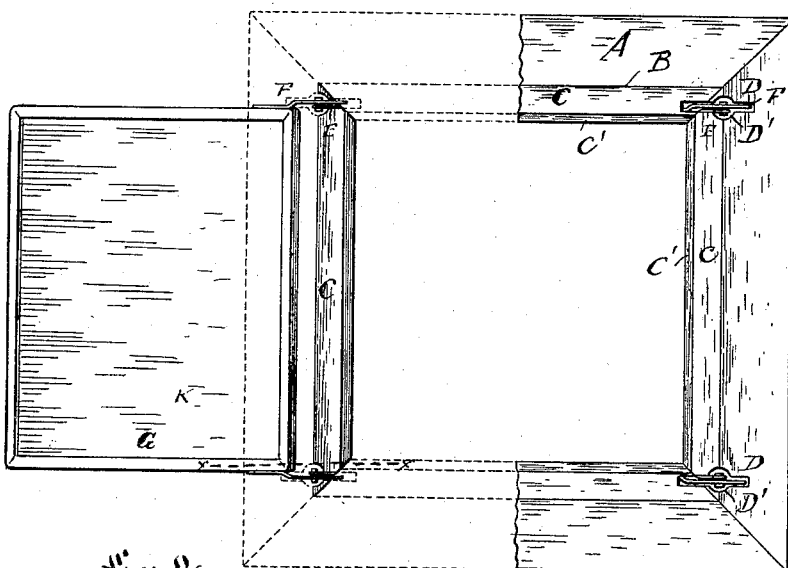
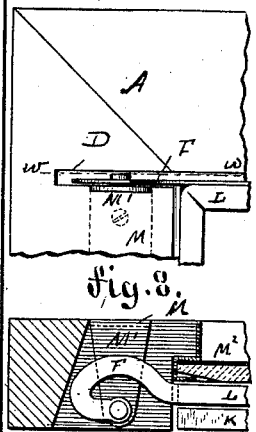
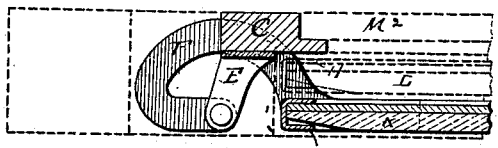
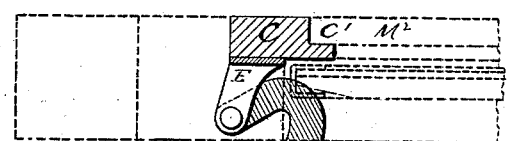
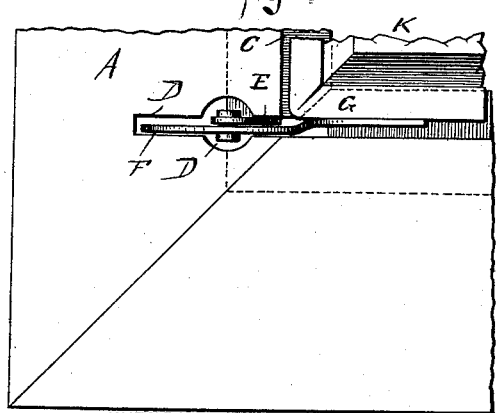
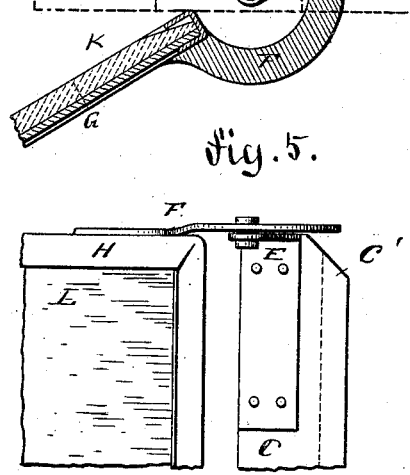
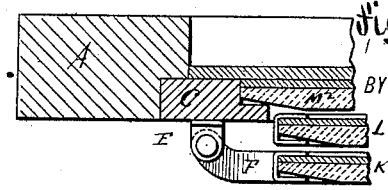
WITNESSES:
INVENTOR
Peter Wiederer.
BY
ATTORNEYS.
N. PETERS, Photo-Lithographer, Washington, D. C.

UNITED STATES PATENT OFFICE.

PETER WIEDERER, OF STAPLETON, NEW YORK.

FOLDING MIRROR.

SPECIFICATION forming part of Letters Patent No. 387,387, dated August 7, 1888.

Application filed March 29, 1888. Serial No. 268,852. (No model.)

*To all whom it may concern:*

Be it known that I, PETER WIEDERER, of Stapleton, in the county of Richmond and State of New York, have invented certain new and useful Improvements in Folding Mirrors, of which the following is a specification.

This invention relates to improvements in that class of folding mirrors known as "triplicate" mirrors; and the object of my invention is to provide a mirror of this kind in which the wing-mirrors are hung by simple hinge devices on the frame of the main mirror.

The invention consists in the combination, with a central-mirror frame and two wing-mirror frames, of hinge-clips secured on the central-mirror frame and hinge-clips on the wing-mirror frames, the hinge-clips on the central-mirror frame being pivoted to the hinge-clips on the wing-mirror frames.

The invention also consists in the construction and combination of parts and details, as will be fully described and set forth hereinafter, and then pointed out in the claims.

In the accompanying drawings, Figure 1 is a rear view of my improved triplicate folding mirror, parts being broken out and shown in dotted lines. Fig. 2 is an enlarged detail horizontal sectional view showing both wing-mirrors on the central mirror, the section being taken on the line $x\ x$, Fig. 1. Fig. 3 is a similar view, the wing-mirrors being swung from the central mirror. Fig. 4 is an enlarged detail rear view of one bottom corner of the central-mirror frame and parts of one wing-mirror. Fig. 5 is a detail face view of one corner of a wing-mirror and the part of the frame to which the same is hinged. Fig. 6 is a detail horizontal sectional view showing a modified construction. Fig. 7 is a rear view of one upper corner of my improved triplicate mirror, showing a modified construction. Fig. 8 is a horizontal sectional view on the line $w\ w$, Fig. 7.

Similar letters of reference indicate corresponding parts.

The central or main mirror frame, A, is provided in its back with the rabbets B for receiving the four cleats C, forming part of said main or central mirror frame. Each cleat C is provided on its rear side with a rabbet, C', for receiving the edges of the main mirror $M^2$. (Shown in dotted lines in Figs. 2 and 3.) Transverse slots D are provided in the side pieces of the central frame, A, and the side cleats, C, at the top and bottom, and at the inner edges of the side pieces of the central frame a circular aperture, D', is made entirely through the main frame at each slot D.

Hinge-clips E are secured to the top and bottom of each side cleat, C, and extend into the slots D, and to the free ends of the hinge-clips E the ends of the hinge-clips F are pivoted, which are secured to the top and bottom, respectively, of the frames G and H of the wing-mirrors K and L, which frames are of such size that they can fit into the space bounded by the inner edges of the cleats C.

The holes D' are provided to receive the hinged ends of the hinge-clips. When the two wing-mirrors have been hinged to the cleats C, the said cleats are placed on the rabbets of the side pieces of the central frame and securely fastened to the same, and then the top and bottom cleats C are placed on the rabbets at the top and bottom of the central frame and are also fastened. The main mirror $M^2$ is then placed against the rabbets of the cleats C and provided with a suitable backing. The front of the main frame can then be covered with plush, leather, composition, paper, metal, or any other suitable material.

As shown in Figs. 2 and 3, the hinge-clips F are of a curved L shape; but it is not absolutely necessary that the said clips should have this shape, as they may be curved in any other manner—for example, when the rabbets B are provided in the front of the main central frame, and the cleats C are also provided on the front, as shown in Fig. 6.

As shown in Figs. 7 and 8, the hinge-clip F is attached to the wing-mirror at the inner edge of the same, and is pivoted to an angle-clip, M, secured to the back of the frame, the upper lug, M', of said clip, to which lug the hinge-clip F is pivoted, projecting into the slot D. In this construction the cleats are replaced by said angle-clips M.

In this application I do not claim, broadly, the construction shown and described in my application for Letters Patent, Serial No. 258,877, filed December 24, 1887. In the construction described in the present application the curved hinge-clips are pivoted to other hinge-clips on the main frame, whereas in the construction in application No. 258,877 the curved hinge-clips are mounted on pintles held in the side pieces of the main frame.

Having thus described my invention, I claim as new and desire to secure by Letters Patent—

1. In a triplicate mirror, the combination, with the central-mirror frame and the wing-mirror frames, of hinge-clips fastened on the central frame and curved hinge-clips secured to the inner ends of the wing-mirror frames and pivoted to the hinge-clips on the central-mirror frame, substantially as herein shown and described.

2. In a triplicate mirror, the combination, with a central frame, of cleats fastened to and forming part of the same, hinge-clips on said cleats, wing-mirror frames, and curved hinge-clips on said wing-mirror frames, which hinge-clips on the wing-mirror frames are pivoted to the hinge-clips on the cleats, substantially as herein shown and described.

3. In a triplicate mirror, the combination, with a central frame having rabbets, of cleats in said rabbets, hinge-clips fastened to said cleats, wing-mirror frames, and hinge-clips on said wing-mirror frames, the hinge-clips on the wing-mirror frames being pivoted to the hinge-clips on the cleats, substantially as herein shown and described.

4. In a triplicate mirror, the combination, with a central-mirror frame and two wing-mirror frames, of curved L-shaped hinge-clips secured to the wing-mirror frames, and detachable clips on the central-mirror frame, to which detachable clips the curved L-shaped hinge-clips are pivoted, substantially as herein shown and described.

In testimony that I claim the foregoing as my invention I have signed my name in presence of two subscribing witnesses.

PETER WIEDERER.

Witnesses:
OSCAR F. GUNZ,
CARL KARP.